Sept. 10, 1929.  D. C. KLAUSMEYER  1,727,607
QUICK ACTING DEPTH GAUGE
Filed April 1, 1925   2 Sheets-Sheet 1
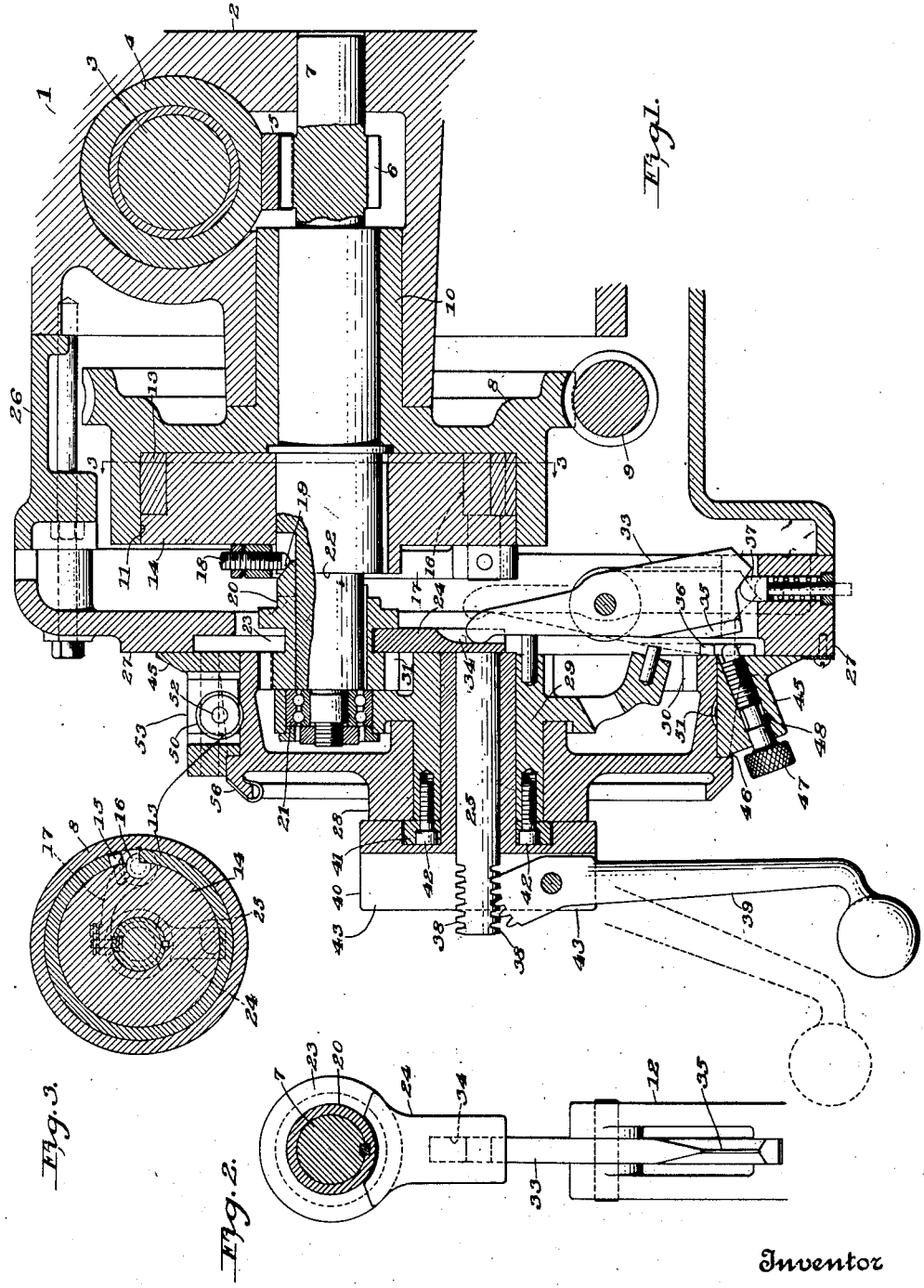
Inventor
David C. Klausmeyer
By Attorney
Albert F. Nathan Sept. 10, 1929.  D. C. KLAUSMEYER  1,727,607
QUICK ACTING DEPTH GAUGE
Filed April 1, 1925  2 Sheets-Sheet 2
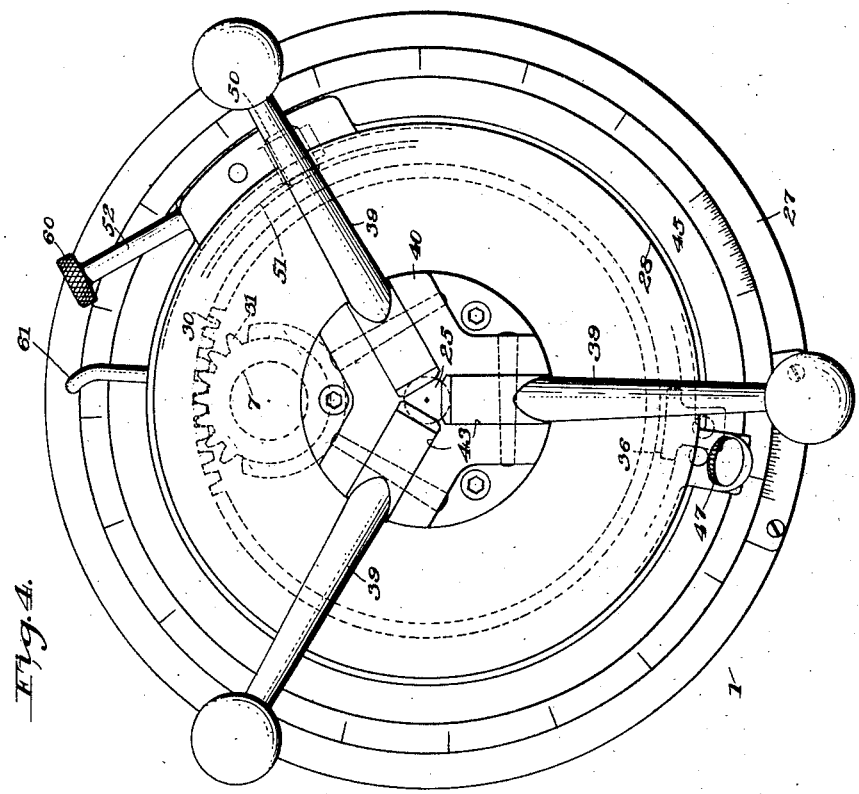
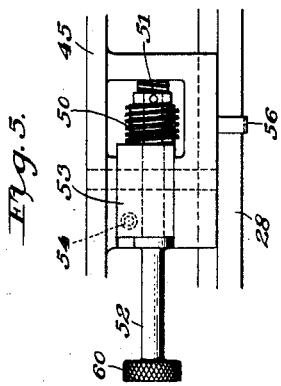
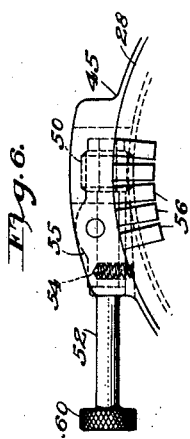
Inventor
David C. Klausmeyer
By Attorney
Albert P. Nathan Patented Sept. 10, 1929.

1,727,607

UNITED STATES PATENT OFFICE.

DAVID C. KLAUSMEYER, OF CINCINNATI, OHIO, ASSIGNOR TO THE CINCINNATI BICKFORD TOOL COMPANY, OF CINCINNATI, OHIO, A CORPORATION OF OHIO.

QUICK-ACTING DEPTH GAUGE.

Application filed April 1, 1925. Serial No. 19,870.

This invention is concerned with adjustable mechanism for limiting the length of travel of a driven member and is particularly concerned with mechanism for limiting the depth of travel of a drilling tool.

In drilling operations, it is very desirable to limit the drilling operation so that when a hole has been drilled in a piece of work to the required depth, the drilling operation will be automatically stopped. Moreover, it is very desirable to stop the drilling operation automatically when the drill spindle approaches either extreme end of its travel. Furthermore, it is desirable to provide means for rapidly traversing the drilling tool to and from the work.

In many drilling machines, as now constructed, the drill spindle is carried by a sleeve which is given a movement of translation for feeding and traversing the drill spindle. The sleeve member carries a rack which meshes with a pinion mounted on a traverse shaft. The traverse shaft is rotated manually to effect traverse movement by the drill spindle and is rotated by a power transmission mechanism to effect feeding movement by the drill spindle. Machines have been constructed heretofore with mechanism for stopping operation of the transverse shaft by the power operated transmission mechanism when the drill spindle is near the end of its travel or when the drill spindle has been moved through a predetermined distance. In such mechanism the means for stopping the linear movement of the spindle sleeve and the means for effecting traverse movement of the sleeve is generally rotated at the same rate as the rotation of the transverse shaft.

In a drilling machine constructed in accordance with my invention a head mechanism is geared to the transverse shaft so as to rotate at a rate different from the rate of rotation of the transverse shaft. Preferably the head mechanism is so geared to the transverse shaft as to effect less than one rotation for the complete travel of the drill sleeve. Although it is desirable to have the head mechanism effect less than one rotation for the complete travel of the drill sleeve, the gearing connection between the head mechanism and the transverse shaft may be varied to change the ratio of movement of the head mechanism to the linear movement of the drill carrying sleeve.

It is an object of my invention to provide said head mechanism with means for effecting a rapid traverse movement of the drill spindle towards and away from the work being operated on. As above set forth the head mechanism is so geared to the transverse shaft as to effect less than one rotation for the complete travel of the drill spindle. By so connecting the head mechanism to the transverse shaft it is possible to effect very quick traverse movements of the drill spindle. The head mechanism also serves to limit the linear movement of the sleeve and the spindle carried thereby when the latter is fed by a power operated transmission mechanism. By reason of the head mechanism effecting less than one complete rotation while the sleeve member is moved the complete length of its travel, it is possible to utilize the head mechanism to limit the movement of the sleeve member in either direction and to disconnect the sleeve member from the transmission mechanism when the sleeve is near either extreme end of its travel. The head mechanism is rotated in accordance with the movement of the sleeve member.

It is not only an object of my invention to disconnect the power operated feed mechanism from the sleeve carrying the drill spindle when the sleeve is near either extreme end of its travel but also to stop the movement of the sleeve member after any predetermined length of feeding movement. Preferably the head mechanism is provided with a dial plate, which is provided with means for disconnecting the power operated transmission mechanism from the sleeve member carrying the drill spindle after a predetermined feeding movement. The dial plate is so mounted as to be quickly set to limit the holes drilled by the machine to a predetermined depth. Moreover, the dial plate may be adjusted to prevent its effecting any control on the depth of the holes being drilled without its being moved to an extreme position. When the dial plate is in any position, a pin carried thereby, which controls the power operated transmission mechanism, may be adjusted thereon to prevent its effecting any control of the travel of the drill carrying sleeve.

A further object of my invention is to so connect the dial plate to the head mechanism, which disconnects the transmission system from the spindle-carrying sleeve when the sleeve is near either end of its travel, as to prevent a setting of the dial plate to effect a travel of the sleeve member beyond the limit of its movement. It is an important feature of my invention to prevent the setting of the dial plate for a travel beyond the extreme length of its travel. If the spindle sleeve were midway in its travel and it were possible to set the dial plate for a depth beyond the travel which is still available by completing the movement of the spindle sleeve, it is apparent that the automatic limit trip controlled by the head would be operated to prevent the drilling of the hole to the required depth. Such a condition would require the operator to reset the work or lower the radial arm in case of a radial drill. However, in a depth gauge constructed in accordance with my invention, it is impossible to set the gauge to a depth beyond the limit of movement of the tool.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:—

Figure 1 is a sectional view of a quick acting depth gauge constructed in accordance with my invention. Fig. 2 is a detail view of the trip mechanism shown in Fig. 1. Fig. 3 is a sectional view along the line 3—3 of Fig. 1. Fig. 4 is an end view of the mechanism shown in Fig. 1. Figs. 5 and 6 are respectively plan and elevational views of the screw mechanism for adjusting the dial plate.

The operative elements of this mechanism are appropriately mounted in a suitable frame which will be shaped and positioned according to the usage contemplated. In the embodiment presented by the drawings, this frame constitutes the head of a radial drilling machine. In the case of a radial drilling machine, the head will be adjustably mounted on a so-called radial arm whereas in the case of an upright drill, the head will be carried by a suitable standard or column. The head 1 shown in Figs. 1 and 4 of the drawings comprises a main frame 2 having a drill spindle 3 mounted thereon. The drill spindle 3 carries a suitable drilling tool (not shown) and is rotated in any conventional manner. The spindle 3 is supported on the main frame 2 by means of a sleeve member 4 which effects a movement of translation to feed or traverse the tool carried by the spindle 3. A rack 5, which is secured to the sleeve 4, meshes with pinion teeth 6 on a shaft 7. If so desired a pinion may be secured to a shaft 7 in place of having the teeth directly cut thereon. The shaft 7 extends to the front of the head 1 and is operated not only to effect feeding movements by the sleeve 4 but also to effect traverse movement of the sleeve towards and away from the work being operated on.

A worm 9, which operates a worm wheel 8, is connected to a suitable source of power (not shown). Such worm member, the worm, and the source of power with the connecting means serve as the power operated transmission mechanism for feeding the drilling tool into the work. The worm wheel 8 is provided with a hub portion 10, having a suitable bearing in the main frame 2 of the head, as shown in Fig. 1 of the drawings. Such hub portion 10 surrounds the shaft 7 and serves as a bearing for said shaft. A recess 11 is formed in the front of the worm wheel 8 for carrying a friction clutch mechanism. The friction clutch mechanism comprises a resilient member or band 13 which may be expanded into frictional engagement with the worm wheel 8 for connecting the worm wheel to a disk 14 which is keyed to the shaft 7. The friction clutch mechanism is of the type disclosed in the patent to Schauer 756,186, dated March 29, 1904 and is shown in detail in Fig. 3. A stationary pin 15, which is secured to the disk 14, engages one end of the band 13. The opposite end of the band 13 is engaged by a cam member 16 which is rotatably supported in the disk 14. Such cam member 16 is pinned to and operated by a lever 17 as shown in Figs. 1 and 3 of the drawings. The lever 17 at one end thereof carries a set screw 18 which is engaged by a cam surface 19 on a block 20 for operating the friction clutch. The block 20 as shown in Fig. 1 of the drawings is slidably mounted on the shaft 7 between a roller bearing 21 and a shoulder 22 on the shaft. The disk 14, as heretofore set forth, and the block 20 as well as the friction disk mechanism are adapted to rotate with the shaft 7. The block 20 is provided with a groove 23 which is engaged by a bifurcated member 24 as shown in Fig. 2 of the drawings. The bifurcated member 24 is secured to an operating rod 25 which is controlled in a manner to be hereinafter set forth for connecting the power operated transmission mechanism to the spindle sleeve 4.

A casing 26, which is secured to the main frame 2, carries a bracket 27. The bracket 27 supports a bearing bracket 29 which in turn rotatably supports an adjusting head member ber 28. The bearing bracket 29 also carries the roller bearing 21 which supports the shaft 7. Internal gear teeth 30 are formed on inside the head 28 for meshing with pinion teeth 31 which are formed on the block 20. The block 20, as heretofore set forth, is secured to the shaft 7 and accordingly the head member must effect rotation in accordance with the movement of the sleeve member 4. The gearing connection between the head 28 and the shaft 7 is such that the head effects less than one complete rotation for the full travel of the sleeve member 4. By reason of the head member effecting less than one complete rotation for the full travel of the sleeve member, it is possible to utilize the movement of the head member for disconnecting the power operated transmission mechanism from the sleeve member when the sleeve member is near either extreme end of its travel.

A trip mechanism comprising a lever 33 is operated by the head member 28 for disconnecting the transmission mechanism from the sleeve member. The lever 33 is pivotally mounted on an arm 12 which projects from the bracket 27. One end of the lever 33 is fitted to a groove 34 in the bifurcated member 24 which is connected to the block 20. Near the opposite end of the lever 33, a wedge shaped portion 35 is formed on one side thereof. Such wedge shaped portion 35 is adapted to be engaged by a lug 36 which is secured to the head member 28. Thus, when the head member is rotated and the lug 36 engages the wedge shaped portion 35 of the lever 33, the lever 33 is given a movement of rotation in a counter clockwise direction as viewed in Fig. 1 of the drawings.

Such counter-clockwise rotation of the lever 33 serves to move the block 20 towards the left, as viewed in Fig. 1, to release the friction clutch mechanism and disconnect the power transmission mechanism from the sleeve member 4. A spring-pressed plunger 37, which is mounted in the bracket 27, engages the pointed lower end of the lever 33 in order to accentuate the position thereof. In Fig. 1 of the drawings, the plunger 37 is shown engaging the lever 33 to hold the friction clutch mechanism in its open position.

The rod 25, which carries the bifurcated member 24, is provided with rack-teeth 38 near the outer end thereof as shown in Fig. 1. Such rack teeth 38 mesh with gear-segments which are formed on the ends of operating arms 39. The arms 39 are pivotally mounted on a block 40 which is secured to the adjusting head 28. Thus, by rotating the arms 39 and the block 40 it is possible to operate the shaft 7 and effect traverse movement of the sleeve 4 either towards or away from the work being operated on. In this regard it will be noted, by reason of the gear connection between the shaft 7 and the adjusting head 28, it is possible to effect a movement of the sleeve 4 the complete length of its travel by rotating the adjusting head 28 through less than one complete rotation. The head 28 and also the block 40 are held in position on the bearing plate 29 by means of a collar 41 which is fitted to a recess in the block 40. The collar 41 is secured to the bearing plate 29 by means of suitable set screws 42.

The levers 39 are positioned in slots 43 which are formed in the block 40. By rotating one of the levers 39 on its pivot a movement of translation of the rod 25 is effected for moving the block 20 to control the operation of the friction clutch mechanism. If the lever 39, shown in Fig. 1 of the drawings, is moved towards the right, as viewed in such figure, the block 20 is moved to release the friction clutch mechanism and disconnect the power operated transmission mechanism from the shaft 7. A movement of the lever 39 in an opposite direction serves to connect the power operated transmission mechanism to the shaft 7.

A dial plate 45, which is rotatably mounted on the adjusting head 28, is held between the bracket 27 and a shoulder 46 on the adjusting head. Such dial plate carries an adjusting screw 47 which is adapted to engage the wedge shaped portion 35 on the trip lever 33 for effecting the opening of the friction clutch mechanism to disconnect the power operated transmission mechanism from the shaft 7. It will be noted a pin 48 is provided in the dial plate to permit only a limited axial movement of the set screw 47. Thus, when desired, the set screw may be moved axially so as to prevent its effecting any control on the trip lever 33. In mechanisms of this type heretofore proposed it has been necessary to set such adjusting mechanism at an extreme point in order to prevent its effecting any control of the power operated transmission mechanism.

A worm member 50, which is mounted on the dial plate 45, meshes with worm teeth 51 which are formed on the periphery of the adjusting head 28 as shown in Fig. 1 of the drawings. Such worm member is carried by a rod 52 which is supported on a bracket 53. The bracket 53 is pivotally mounted on the dial plate 45 as shown in Figs. 1, 5 and 6 of the drawings. A spring member 54, as shown in Figs. 5 and 6 of the drawings, is provided for exerting a force on the bracket 53 tending to hold the worm 50 in mesh with the worm teeth 51 on the adjusting head. By such connection it is apparent a very fine adjustment of the dial plate 45 with respect to the adjusting head may be effected by rotating the rod 52 and a quick adjustment of the dial plate with respect to the adjusting head may be effected by rotating the bracket 53 on its pivotal support for moving the worm 50 out of mesh with the worm teeth 51. When the worm 50 is demeshed from the worm 51 it is possible to rotate the dial for quickly moving it to any set position. A knob 60 is mounted on the rod 52 for rotating it and a projecting pin 61 is secured to the dial plate to be engaged by the operator's finger when the rod is rotated on its pivot to move the worm out of mesh with the worm teeth. Observation clips 56, which are secured to the adjusting head 28, may be moved to any desired position on the head to indicate various settings of the dial plate. Any desired number of such clips may be carried by the adjusting head.

In the above described mechanism it will be noted the clutch mechanism is operated by one of the levers 39 for connecting the power operated transmission mechanism to the spindle carrying sleeve 4. The clutch mechanism is released either by the set screw 47 operating the trip lever 33 when a hole is drilled to the required depth or when the trip lever is operated by the adjusting head 28 at the extreme end of the travel of the spindle carrying sleeve. The arms 39 also serve to effect a rapid traverse movement of the spindle carrying sleeve 4 as above set forth. Attention is also called to the fact that the set screw 47 operates in the path of movement of the lug 36 which is secured to the adjusting head 28. By reason of such fact it is impossible to set the dial plate 45 for drilling a hole beyond the possible length of travel of the spindle carrying sleeve 4. Accordingly, the operator is notified at once whether or not enough travel is left for the spindle carrying sleeve to drill the hole the required depth. If sufficient travel is not left for drilling the hole to the required depth further adjustments of the machine must be made such as changing the radial arm which carries the head.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims.

Having thus revealed this invention, I claim as new and desire to secure the following combinations and elements, or equivalents thereof, by Letters Patent of the United States:—

1. In a drilling machine, the combination comprising a sleeve member; power driven transmission mechanism including a clutch for translating said sleeve; a rotatable head having a manually operable lever carried thereon for effecting, in a single rotation of said head, complete traverse movement of said sleeve; means including a clutch operating trip-lever having a fixed cam-surface and a lug carried by said rotatable head and acting upon said cam-surface for automatically disconnecting the transmission mechanism from the sleeve when the sleeve is near either extreme end of its travel.

2. In a depth gauge for a drilling machine, the combination comprising a sleeve member; power driven transmission mechanism for effecting a feeding movement of said sleeve; a rotatable member for effecting traverse movement of the sleeve; means carried by said rotatable member for automatically disconnecting the sleeve from the transmission mechanism when the sleeve is near either end of its travel; and means comprising an adjustable dial plate mounted on said rotatable member for disconnecting the transmission mechanism from the sleeve after a predetermined feeding movement of the sleeve, the amount of said movement being indicated by said dial.

3. In a depth gauge for a drilling machine, the combination comprising a fixed bracket; a sleeve member carrying a drill spindle; power driven transmission mechanism for translating said sleeve; a rotatable member for effecting traverse movement of the sleeve; means including a lever pivotally mounted on said bracket and a cooperating lug carried by said rotatable member for automatically disconnecting the sleeve from the transmission mechanism when the sleeve is near either end of its travel during a feeding movement; and a dial plate adjustably mounted on said rotatable member for indicating in advance a predetermined movement of said sleeve and disconnecting the transmission mechanism from the sleeve after the sleeve has been given such predetermined movement.

4. In a depth gauge for a drilling machine, the combination comprising a sleeve member; means comprising power driven transmission mechanism for translating said sleeve; a rotatable head for effecting traverse movement of said sleeve; control mechanism for connecting and disconnecting the transmission mechanism to and from said sleeve; means carried by the head for operating the control mechanism to disconnect the transmission mechanism from the sleeve when the sleeve is near either extreme end of its travel; and an adjustable dial plate for operating the control mechanism to release the transmission mechanism from the sleeve after a predetermined movement of the sleeve, said dial plate being so related to the head as to prevent the setting thereof beyond the range of travel of the sleeve.

5. In a machine tool, the combination comprising a translatable sleeve; power driven transmission mechanism for translating said sleeve; means for connecting said transmission mechanism to said sleeve; a head for effecting rapid movement of said sleeve and for limiting the movement of the sleeve by the transmission mechanism; manually operable means mounted on said head for rotating the latter; and speed multiplying gearing intermediate said head and the sleeve translating means whereby the sleeve may be moved from one end to the opposite end of its travel by single rotation of said head.

6. In a machine tool, the combination comprising a translatable sleeve; power driven transmission mechanism for translating said sleeve; means for connecting said transmission mechanism to said sleeve; a head for effecting rapid traverse movement of said sleeve and for limiting the movement of the sleeve by the transmission mechanism; a speed multiplying transmission intermediate said head and the speed translating means whereby the sleeve may be moved from one end to the opposite end of its travel by a single rotation of said head; and an adjustable dial plate for releasing the transmission mechanism from the sleeve after a predetermined movement of the latter, said dial plate indicating the amount of such movement.

7. In a machine tool, the combination comprising a sleeve member; a shaft for effecting translatory movement of said sleeve; a pinion mounted on said shaft; a manually rotatable head member having gear teeth formed thereon for meshing with said pinion, the ratio between said gear and pinion being such that one complete rotation of the gear moves the sleeve the full length of its travel; a hand lever connected with said head member for effecting rotation of said member and thereby traverse movement of said sleeve; and a power operated transmission mechanism for operating said shaft under the control of said head.

8. In a machine tool, the combination comprising a sleeve member; a power driven transmission mechanism for translating said sleeve, a trip mechanism for disconnecting said transmission mechanism from said sleeve; a head member for controlling said trip mechanism to prevent moving the sleeve member beyond predetermined limits; a dial plate adjustaby mounted on said head member; and a pin carried by said dial plate for operating the trip mechanism after a predetermined movement of the sleeve-member, said pin being adjustable to prevent operation of the trip mechanism thereby.

9. In a machine tool the combination comprising a trip mechanism; a rotatable head member; projecting means on said head member for releasing said trip mechanism when rotated through nearly a complete rotation from either extreme position; a dial plate adjustably mounted on said head member; and projecting means on said plate for releasing said trip mechanism after a predetermined rotation of the head member, the projecting means on the plate having the same path of movement as the projecting means on the head member.

10. In a machine tool, the combination comprising a translatable sleeve; power driven transmission mechanism for translating said sleeve; a head for effecting rapid traverse movement of the sleeve, a speed multiplying connection between said head and a portion of said transmission whereby said head is rotated less than one rotation to move the sleeve from one end to the opposite end of its travel; means carried by said head for releasing the sleeve from the transmission mechanism when the sleeve is near either end of its travel; and a lever carried by the head for rotating the head and for controlling the connecting of the transmission mechanism to the sleeve.

11. In a machine tool, the combination comprising a translatable sleeve; power driven transmission mechanism for translating said sleeve; a head for effecting rapid traverse movement of the sleeve; a speed multiplying connection between said head and a portion of said transmission whereby said head is rotated less than one rotation to move the sleeve from one end to the opposite end of its travel; means carried by said head for releasing the sleeve from the transmission mechanism when the sleeve is near either end of its travel; a lever carried by the head for rotating the head and for controlling the connecting of the transmission mechanism to the sleeve; and an adjustable dial plate carried by the head for releasing the transmission mechanism from the sleeve after a predetermined movement of the latter.

12. In a machine tool, the combination comprising a translatable sleeve; means comprising power driven transmission mechanism for translating said sleeve; a head rotatably mounted eccentric to said transmission and connected therewith by speed multiplying connection for effecting rapid traverse movement of the sleeve, said head being rotated less than one rotation to move the sleeve from one end to the opposite end of its travel; a lever carried by the head for rotating the head and for controlling the connecting of transmission mechanism to the sleeve; and an adjustable dial plate for releasing the transmission mechanism from the sleeve after a predetermined movement of the latter.

13. In a machine tool, the combination comprising a translatable sleeve; a spindle rotatably affixed thereto; a power driven transmission mechanism for translating said sleeve; means comprising a clutch for connecting said transmission mechanism to said sleeve; a control mechanism for governing the operation of said clutch; a rotatable head arranged eccentric to said transmission and connected therewith by speed multiplying gearing for effecting traverse movement of said sleeve, said head being rotated less than one rotation to effect full travel of the sleeve; and means comprising a lever mounted on said head for not only rotating the head but also for controlling said control mechanism.

14. In a machine tool, the combination comprising a translatable sleeve having a rack formed thereon; a pinion engaging said rack; a shaft carrying said pinion; a power driven transmission mechanism; a clutch for connecting said transmission mechanism to the pinion shaft to effect translation of the sleeve; control mechanism for operating said clutch to connect the transmission mechanism to said pinion shaft; trip mechanism for holding said control mechanism in an operative or an inoperative position; a head connected to said pinion shaft for effecting traverse movement of said sleeve, said head being rotated less than one rotation to effect full travel of the sleeve; and means mounted on said head for releasing said latch mechanism when the sleeve is near either extreme end of its travel.

15. In a machine tool, the combination comprising a trip mechanism; a rotatable head member; a lug projecting from said head member for releasing said trip mechanism when rotated through nearly a complete rotation from either extreme position; a dial plate adjustably mounted on said head member; and an adjustable pin on said plate for releasing said trip mechanism after a predetermined rotation of the head member, said lug lying in the path of adjustment of said pin whereby movement of the latter beyond said lug is prevented.

16. In a machine tool, the combination comprising a sleeve member; a shaft for effecting translatory movement of said sleeve; a pinion mounted on said shaft; a head member having internal gear teeth formed thereon for meshing with said pinion to move said sleeve, said head being rotated less than one complete rotation for moving the sleeve the complete length of its travel; a hand-lever connected with said head and affording means for rotating said head and shaft to effect traverse movement of said sleeve; a power driven transmission mechanism adapted to be connected to said shaft for translating said sleeve; and means for limiting the operation of the sleeve by the transmission mechanism in accordance with the movement of said head.

17. In a depth gauge for a drilling machine, the combination comprising a sleeve member adapted to be translated a limited distance; power driven transmission mechanism for translating said sleeve; means comprising a head member for disconnecting the transmission mechanism from the sleeve when the latter is near either end of its travel; an adjustable dial plate mounted on said head member for disconnecting the transmission mechanism from the sleeve when the sleeve has been moved through a predetermined distance; and means active after said sleeve has been given a partial translation for preventing the setting of the dial plate for a movement of the sleeve greater than the amount of movement yet available.

18. In a machine tool, the combination comprising a sleeve member; a shaft for effecting translatory movement of said sleeve; a head member having internal gear teeth formed thereon and meshing with gear teeth operated by said shaft, said head being rotated to effect a rapid traverse movement of the sleeve; a hand-lever connected with said head and affording means for rotating said head and shaft to effect translation of said sleeve; a power driven transmission mechanism adapted to be connected to said shaft for translating said sleeve; and means for limiting the movement of the sleeve by transmission mechanism in accordance with the movement of the head.

19. In a machine tool, the combination comprising a sleeve member; a shaft geared to said sleeve for effecting translatory movement thereof; a manually rotatable head member having internal gear teeth formed thereon; a hand-lever carried by said head member for manually rotating said member; means for connecting said internal gear teeth to said shaft so that less than one rotation of the head serves to move the sleeve the complete length of its travel; power driven transmission mechanism for effecting movement of said sleeve; and means for limmovement of the sleeve by the transmission mechanism in accordance with the movement of the head.

20. In a depth gauge for a machine tool, the combination comprising a sleeve member adapted to be translated a limited distance; means comprising power driven transmission mechanism for translating said sleeve; means comprising a head member connected to said sleeve for stopping the movement of the sleeve by the transmission mechanism near the end of the sleeve travel; and means comprising a dial plate adjustably mounted on said head member for stopping the movement of the sleeve by the transmission mechanism after a predetermined travel by the sleeve, said means being constructed to prevent the setting of the dial plate for a movement of the sleeve greater than the amount of movement yet available.

21. In a depth gauge for a machine tool, the combination comprising a sleeve member adapted to be translated a limited distance; means comprising a power driven transmission mechanism for translating said sleeve; a member operated in accordance with the movement of the sleeve for stopping the movement of the sleeve by the transmission mechanism when the sleeve is near the end of its travel; an adjustable member for stopping the movement of the sleeve by the transmission mechanism after a predetermined movement; and means for preventing the setting of the adjustable member for a movement of the sleeve greater than the amount of movement yet available.

22. In a machine tool, the combination comprising a translatable sleeve; a shaft connected to said sleeve for effecting translatory movement thereof; a power operated transmission mechanism for rotating said shaft to effect feeding movements by said sleeve; and a head mechanism connected to said shaft by motion multiplying gearing to give to said shaft a sufficient number of rotations to effect the entire translatory movement of said sleeve by a single rotation of said head mechanism, said head mechanism serving to rotate the shaft during traverse movement of the sleeve; a first stop rotatable with said head mechanism to stop operation of the shaft by the transmission mechanism when the sleeve is near the end of its travel; and a second stop adjustable relative to said head and movable therewith to stop the operation of the shaft by the transmission mechanism when the sleeve has been moved through a predetermined distance.

23. In a machine tool, the combination comprising a translatable sleeve; a shaft geared to said sleeve for effecting translatory movement thereof; a head for effecting traverse movements by said sleeve and having internal gear teeth meshing with gear teeth carried by said shaft, said head being connected to the shaft to rotate at a slower rate; a manually actuable lever carried by said head for effecting rotations thereof; power mechanism connected to said shaft for effecting feeding movement by the sleeve; and means operated in accordance with the movement of the head for limiting the movement of the sleeve by said power mechanism.

24. In a machine tool, the combination comprising a translatable sleeve; a head mechanism operatively connected to said sleeve for effecting translatory movement thereof, said head mechanism being rotated approximately one rotation for the movement of the sleeve through its complete travel; power transmission mechanism for feeding said sleeve; means for automatically controlling the operation of the sleeve by said transmission mechanism in accordance with the movement of the head mechanism; and manually operable means carried by said head for controlling the operation of said sleeve.

25. A depth gauge combining a sleeve; a rack carried by said sleeve; a pinion in mesh with said rack; power means to rotate said pinion to effect translation of said sleeve; said power means comprising a shaft; a gear rotatable coaxial with said shaft; a clutch adapted to lock said gear and shaft together; manual means to engage said clutch; automatic means to disengage said clutch at a predetermined point in the translation of said sleeve, said automatic means comprising a member rotated from said shaft; and a clutch shifting lever having one end arranged in the path of said member and adapted to be moved thereby to cause the other end thereof to release said clutch.

26. A depth gauge combining a stationary element; a sleeve; a rack carried by said sleeve; a pinion in mesh with said rack; power means to rotate said pinion to effect translation of said sleeve; said power means comprising a shaft; a gear rotatable coaxial with said shaft; a clutch adapted to lock said gear and shaft together; manual means to engage said clutch; automatic means to disengage said clutch at a predetermined point in the translation of said sleeve, said automatic means comprising a member rotated from said shaft; a clutch shifting lever fulcrumed on said stationary element and having one end arranged in the path of said member and adapted to be moved thereby to cause the other end thereof to release said clutch; said manual clutch shifting means acting to restore said lever to its position in the path of said member; and detent means yieldingly to hold said lever alternately in and out of the path of said member.

In witness whereof, I have hereunto subscribed my name.

DAVID C. KLAUSMEYER.

CERTIFICATE OF CORRECTION.

Patent No. 1,727,607.            Granted September 10, 1929, to

DAVID C. KLAUSMEYER.

It is hereby certified that error appears in the printed specification of the above numbered patent requiring correction as follows: Page 6, claim 19, after line 103, insert the syllable and word "iting the"; and that the said Letters Patent should be read with this correction therein that the same may conform to the record of the case in the Patent Office.

Signed and sealed this 1st day of October, A. D. 1929.

(Seal)
                                       M. J. Moore,
                             Acting Commissioner of Patents.